United States Patent
Yang et al.

(10) Patent No.: US 12,493,703 B2
(45) Date of Patent: Dec. 9, 2025

(54) METHOD AND APPARATUS FOR DATA PROTECTION, READABLE MEDIUM AND ELECTRONIC DEVICE

(71) Applicant: Lemon Inc., Grand Cayman (KY)

(72) Inventors: Xin Yang, Los Angeles, CA (US); Jiankai Sun, Los Angeles, CA (US); Weihao Gao, Beijing (CN); Junyuan Xie, Beijing (CN); Chong Wang, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 121 days.

(21) Appl. No.: 18/565,000

(22) PCT Filed: Apr. 28, 2022

(86) PCT No.: PCT/SG2022/050260
§ 371 (c)(1),
(2) Date: Nov. 28, 2023

(87) PCT Pub. No.: WO2022/250608
PCT Pub. Date: Dec. 1, 2022

(65) Prior Publication Data
US 2024/0249004 A1    Jul. 25, 2024

(30) Foreign Application Priority Data
May 28, 2021 (CN) .......................... 202110591782.0

(51) Int. Cl.
*G06F 21/60* (2013.01)
*G06N 20/20* (2019.01)

(52) U.S. Cl.
CPC ........... *G06F 21/602* (2013.01); *G06N 20/20* (2019.01)

(58) Field of Classification Search
CPC ....... G06F 21/602; G06N 20/20; G06N 20/00
See application file for complete search history.

(56) References Cited

U.S. PATENT DOCUMENTS

2021/0141940 A1    5/2021   Naqvi et al.
2021/0143987 A1*   5/2021   Xu .................. H04L 63/062
(Continued)

FOREIGN PATENT DOCUMENTS

CN    109165515 A    1/2019
CN    111062045 A    4/2020
(Continued)

OTHER PUBLICATIONS

International Search Report in PCT/SG2022/050260, mailed Aug. 12, 2022, 4 pages.
(Continued)

*Primary Examiner* — Sangseok Park
(74) *Attorney, Agent, or Firm* — Astute IP Law Group

(57) ABSTRACT

The present disclosure relates to a method and a device for data protection, a readable medium and an electronic apparatus, and the method comprises: acquiring a target identification information union set, wherein the target identification information union set comprises target encryption identification information of a first party of a joint training model and target encryption identification information of a second party of the joint training model, the target encryption identification information in the target identification information union set being obtained by encrypting according to a secret key of the first party and a secret key of the second party; and determining, according to the target identification information union set, a target sample data set for training the joint training model. Therefore, an identification information intersection of the first party and the second party does not need to be determined in advance as in the related technology.

14 Claims, 5 Drawing Sheets

(56) References Cited

U.S. PATENT DOCUMENTS

| | | | | |
|---|---|---|---|---|
| 2022/0004932 | A1* | 1/2022 | Gu | G06F 30/27 |
| 2022/0019663 | A1* | 1/2022 | Stapleton | G06F 21/554 |

FOREIGN PATENT DOCUMENTS

| | | | |
|---|---|---|---|
| CN | 111368196 | A | 7/2020 |
| CN | 111598186 | A | 8/2020 |
| CN | 111666576 | A | 9/2020 |
| CN | 111709051 | A | 9/2020 |
| CN | 112085159 | A | 12/2020 |
| CN | 112132292 | A | 12/2020 |
| CN | 112149140 | A | 12/2020 |
| CN | 112231768 | A | 1/2021 |
| CN | 112347476 | A | 2/2021 |
| CN | 112785002 | A | 5/2021 |
| EP | 3477527 | A1 | 5/2019 |
| KR | 102143525 | B1 | 8/2020 |
| WO | 2020029589 | A1 | 2/2020 |

OTHER PUBLICATIONS

Li et al., "Research on Privacy-Preserving K-means Clustering Model," Science and Technology of China Academy of Electronic Sciences, May 20, 2021, vol. 16, No. 5, pp. 506-516.

Ma et al., "On Safeguarding Privacy and Security in the Framework of Federated Learning," IEEE Network, Aug. 31, 2020, vol. 34, No. 4, pp. 1-7.

Wang, "Research on Privacy Protection for Distributed Computing," China Academic Journal Electronic Publishing House, Jan. 15, 2021, No. 1, pp. 1-156.

Weng et al., "Practical Privacy Attacks on Vertical Federated Learning," Anonymous Submission to ACM CCS, May 5, 2021, pp. 1-13.

Zhou et al., "Cryptography open experimental design integrating scientific research innovation," Science & Technology Vision, May 15, 2021, No. 19, pp. 184-186.

Office Action in CN202110591782.0, mailed Mar. 7, 2023, 10 pages.

Office Action in CN202110591782.0, mailed Jul. 18, 2023, 8 pages.

Notice of Decision of Granting Patent Right for Invention in CN202110591782.0, mailed Sep. 21, 2023, 3 pages.

* cited by examiner

METHOD AND APPARATUS FOR DATA PROTECTION, READABLE MEDIUM AND ELECTRONIC DEVICE

CROSS-REFERENCE TO RELATED APPLICATION

The present application is a 35 U.S.C. § 371 National Phase of International Patent Application No. PCT/SG2022/050260, filed Apr. 28, 2022, which claims priority to Chinese patent Application No. 202110591782.0, filed on May 28, 2021, and titled "DATA PROTECTION METHOD AND APPARATUS, READABLE MEDIUM AND ELECTRONIC DEVICE", the disclosures of which are incorporated herein by reference in their entities.

TECHNICAL FIELD

The present disclosure relates to the technical field of computers, and more particularly, to a method and an apparatus for data protection, a readable medium and an electronic device.

BACKGROUND

Along with the development of artificial intelligence technology, machine learning is more and more widely applied. In recent years, in order to protect data security and solve a problem of data islands, a joint training model is generally adopted in related modes, to complete common training of a machine learning model on a premise of not exposing original data, each enterprise participating in common modeling is usually called a party, and in a process of training the joint training model, in order to avoid information leakage and improve the data security, information of each party is important data needed to be protected.

SUMMARY

The Summary of the present disclosure is provided to introduce a conception in a brief form, and the conception will be described in detail in the part of Description of Embodiments. This summary is not intended to identify key features or essential features of the claimed technical solutions, nor is it intended to be used to limit the scope of the claimed technical aspects.

In a first aspect, the present disclosure provides a method for data protection, and the method includes: acquiring a target identification information union set, the target identification information union set includes target encryption identification information of a first party of a joint training model and target encryption identification information of a second party of the joint training model, and the target encryption identification information in the target identification information union set being obtained by encrypting according to a secret key of the first party and a secret key of the second party; and determining, according to the target identification information union set, a target sample data set for training the joint training model.

In a second aspect, the present disclosure provides an apparatus for data protection, and the device includes: a union set acquisition module configured to, acquire a target identification information union set, the target identification information union set including target encryption identification information of a first party of a joint training model and target encryption identification information of a second party of the joint training model, and target encryption identification information in the target identification information union set being obtained by encrypting according to a secret key of the first party and a secret key of the second party; and a sample data set determination module configured to determine, according to the target identification information union set, a target sample data set for training the joint training model.

In a third aspect, the present disclosure provides a computer readable medium having a computer program stored thereon, wherein when the computer program is executed by a processing apparatus, causes the processing apparatus to perform steps of the method provided by the first aspect of the present disclosure.

In a fourth aspect, the present disclosure provides an electronic device, including: a memory having a computer program stored thereon;
   a processor configured to execute the computer program in the memory, to perform steps of the method provided by the first aspect of the present disclosure.

Other features and advantages of the present disclosure will be described in detail in the part of Description of Embodiments.

BRIEF DESCRIPTION OF DRAWINGS

The above and other features, advantages and aspects of the embodiments of the present disclosure will become more apparent in conjunction with the accompanying drawings and with reference to following detailed description. Throughout the drawings, the same or similar reference numerals denote the same or similar elements. It should be understood that the drawings are schematic, and components and elements are not necessarily drawn to scale. In the drawings.

DESCRIPTION OF EMBODIMENTS

Figure 1:
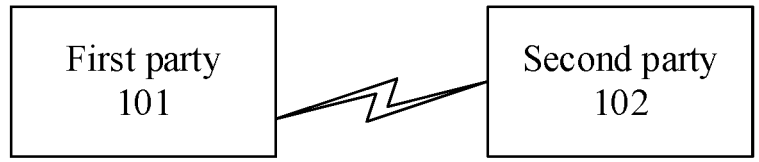
FIG. 1 is a schematic diagram of an implementation environment according to an exemplary embodiment.

Embodiments of the present disclosure will be described in more detail below with reference to the accompanying drawings. Although certain embodiments of the present disclosure are shown in the drawings, it should be understood that the present disclosure may be implemented in various forms and should not be construed as limited to the embodiments set forth herein, but rather these embodiments are provided for thorough and complete understanding of the present disclosure. It should be understood that the drawings and embodiments of the present disclosure are only used for exemplary effects, and not intended to limit the scope of protection of the present disclosure.

It should be understood that various steps described in the method embodiments of the present disclosure may be executed in different sequences, and/or executed in parallel. In addition, the method embodiments may include additional steps and/or omit the steps shown. The scope of the present disclosure is not limited in this regard.

The terms "including" and variations thereof as used herein are open ended, i.e., "including but not limited to". The term "based on" is "at least partially based on". The term "one embodiment" means "at least one embodiment"; the term "another embodiment" means "at least one further embodiment"; the term "some embodiments" means "at least some embodiments". The relevant definitions of other terms are given in following description.

It should be noted that the concepts of "first", "second" and the like mentioned in the present disclosure are only used for distinguishing different devices, modules or units, and not used for limiting the sequence or mutual dependency relationship of the functions executed by the devices, modules or units.

It should be noted that modification of "a" and "a plurality of" mentioned in the present disclosure is schematic and non-limiting, and it should be understood by those skilled in the art that unless the context clearly indicates otherwise, it should be understood as "one or more".

Names of message or information exchanged among multiple devices in the embodiments of the present disclosure are only used for illustrative purposes, but not intended to limit the scope of these messages or information.

Federated machine learning is also called federated learning and joint learning, and according to different distribution conditions of data used by federated learning in each party, federated learning can be divided into three types: horizontal federated learning (HFL), vertical federated learning (VFL) and federated transfer learning (FTL). The vertical federated learning is feature-based federated learning, and it is suitable for a case in which data samples of different parties have relatively large overlapping, but an overlapping degree of sample features is not high. In the related technology, the vertical federated learning needs to align samples in advance, that is, to find out user intersection of various parties, however, for each party, it can know that an opposite party also has data of users in the intersection from the user intersection, so as to know information of which users the opposite party has, thus, the user intersection may cause information leakage, and the data security in the joint learning process is reduced.

In view of this, the present disclosure provides a method for data protection, an apparatus, a readable medium and an electronic device, to improve data security in a joint learning process.

Firstly, an application scene of the present disclosure is introduced. The present disclosure can be applied to a federated learning or joint learning process. FIG. 1 is a schematic diagram of an implementation environment according to an exemplary embodiment. As shown in FIG. 1, the implementation environment may include the first party 101 of a joint training model and a second party 102 of a joint training model, and the first party 101 and the second party 102 may interact through a network to receive or send a message, etc., for example, communication may be performed in any one of 3G, 4G, 5G, NB-IOT, eMTC, LTE, LTE-A and so on.

It should be noted that, in the present disclosure, when it is mentioned that the first party performs operations of sending, receiving and processing data, it can be understood that the first party performs these operations by means of a server device of the first party, and when it is mentioned that the second party performs operations of sending, receiving and processing data, it can be understood that the second party performs these operations by means of a server device of the second party.

The technical aspects provided in the embodiment of the present disclosure is described in detail below.

Figure 2:
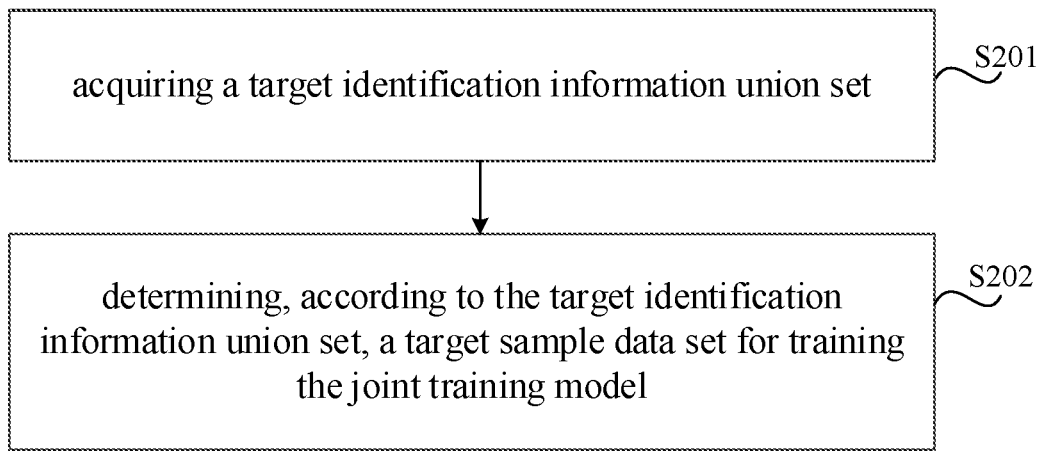
FIG. 2 is a flowchart of a method for data protection according to an exemplary embodiment.

FIG. 2 is a flowchart of a method for data protection according to an exemplary embodiment, and the method can be applied to the first party of the joint training model, for example, the first party 101 as shown in FIG. 1. As for a supervised machine learning model, generally, a party having sample label data is referred to as an active party, and a party who does not have the sample label data is referred to as a passive party. In an embodiment of the present disclosure, the first party 101 is an active party of the joint training model, and correspondingly, the second party 102 is a passive party of the joint training model. Alternatively, in another embodiment, the first party 101 is a passive party of the joint training model, and correspondingly, the second party 102 is an active party of the joint training model. As shown in FIG. 2, the method may include S201 and S202.

At S201, acquiring a target identification information union set.

The target identification information union set includes target encryption identification information of the first party of the joint training model and target encryption identification information of the second party of the joint training model, and the target encryption identification information in the target identification information union set is obtained by encrypting according to a secret key of the first party and a secret key of the second party.

The secret key of the first party can be a random secret key pre-generated by the first party or a preset fixed secret key, and the secret key of the second party can be a random secret key pre-generated by the second party or a preset fixed secret key, and an acquisition mode of the secret key is not limited in the present disclosure.

The target encryption identification information in the target identification information union set is encrypted according to the secret key of the first party and the secret key of the second party at the same time, and due to a fact that the first party cannot know the secret key of the second party, and the second party cannot know the secret key of the first party, the identification information is encrypted according to the secret keys of the two parties at the same time, and one party cannot know original identification information of an opposite party, thereby prevent a phenomenon of information leakage.

In S202, determining, according to the target identification information union set, a target sample data set for training the joint training model.

The target sample data set can be used as a sample data set of the first party, for training to obtain the joint training model.

According to the above technical aspect, the target identification information union set is acquired, and the target sample data set for training the joint training model is determined according to the target identification information union set, the target identification information union set includes the target encryption identification information of the first party and the target encryption identification information of the second party, and the target encryption identification information in the target identification information union set is obtained by encrypting according to the secret key of the first party and the secret key of the second party. Therefore, on one hand, an identification information intersection of the first party and the second party does not need to be determined in advance as in the related technology, which prevents one party from knowing, through the intersection, which users the opposite party has, and on the other hand, the identification information is encrypted according to the secret keys of the two parties at the same time, and one party cannot obtain the original identification information of the opposite party from the target identification information union set, so that the information leakage condition is avoided, and the data security in the joint learning process is improved.

In the present disclosure, the secret key of the first party may include a plurality of first secret keys, and the secret key of the second party may include a plurality of second secret keys. The number of the first secret keys and the number of the second secret keys are not limited in the present disclosure, and the number of the first secret keys and the number of the second secret keys can be the same or different. As an example, the plurality of the first secret keys include s1, s2, and s3, and the plurality of the second secret keys include t1, t2, and t3, it should be noted that the example is merely illustrative, which does not constitute a limitation on the embodiment of the present disclosure.

The target identification information union set is obtained according to the first encryption identification information of the first party and the second encryption identification information of the second party, and the first encryption identification information and the second encryption identification information are obtained by encrypting according to a part of the first secret key in the plurality of the first secret keys and a part of the second secret key in the plurality of the second secret keys.

The part of the first secret key is a portion of the secret key in the plurality of the first secret keys and may have one or more, and the part of the second secret key is a portion of the secret key in the plurality of the second secret keys and may have one or more. Exemplarily, the part of the first secret key includes s1, and the part of the second secret key includes t1, the first encryption identification information can be obtained by encrypting original identification information of the first party according to s1 and t1, and the second encryption identification information can be obtained by encrypting original identification information of the second party according to s1 and t1.

Figure 3:
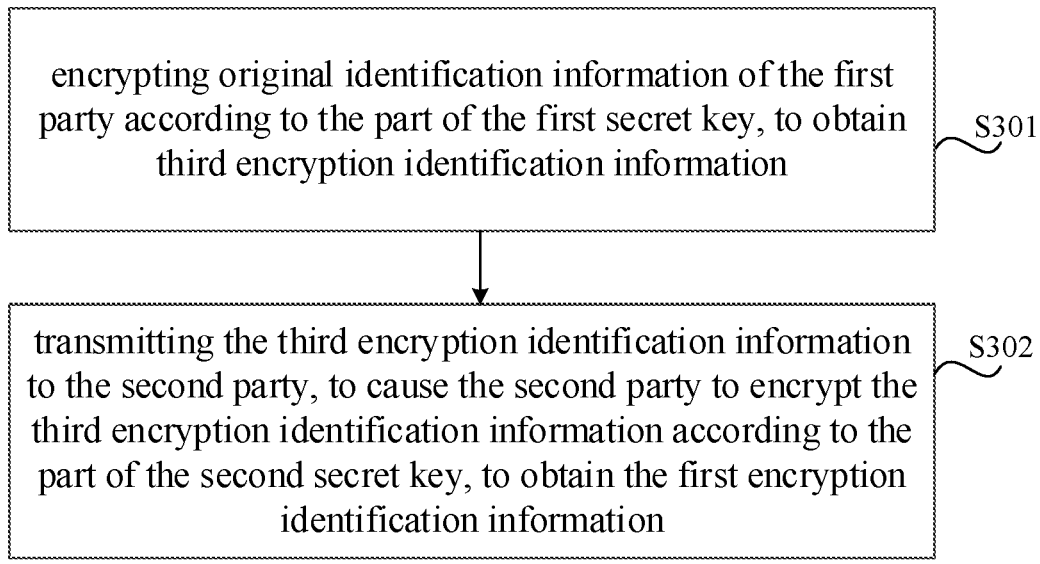
FIG. 3 is a flowchart of a method for obtaining first encryption identification information of a first party according to an exemplary embodiment.

FIG. 3 is a flowchart of a method for obtaining the first encryption identification information of the first party according to an exemplary embodiment, as shown in FIG. 3, the method includes S301 and S302.

At S301, encrypting original identification information of the first party according to the part of the first secret key, to obtain third encryption identification information.

At S302, transmitting the third encryption identification information to the second party, to cause the second party to encrypt the third encryption identification information according to the part of the second secret key, to obtain the first encryption identification information.

The original identification information of the first party can be multiple, and for each original identification information, the first party can encrypt the original identification information according to the part of the first secret key, to obtain the third encryption identification information corresponding to the original identification information. For example, the first party can randomly arrange a sequence of the plurality of the third encryption identification information, such as a random arrangement according to the Shuffle method, and send a set formed by the third encryption identification information after random arrangement to the second party.

For each third encryption identification information, the second party can encrypt the third encryption identification information according to the part of the second secret key, thereby obtaining the first encryption identification information encrypted according to the part of the first secret key and the part of the second secret key. Exemplarily, the second party can randomly arrange a sequence of the plurality of the first encryption identification information, and then send a set formed by the first encryption identification information after random arrangement to the first party.

In this way, both the first party and the second party can obtain the first encryption identification information of the first party. Moreover, the third encryption identification information is encrypted according to the part of the first secret key of the first party, so that the second party cannot know the original identification information of the first party through the third encryption identification information, and the leakage of the original information of the first party is not caused.

Figure 4:
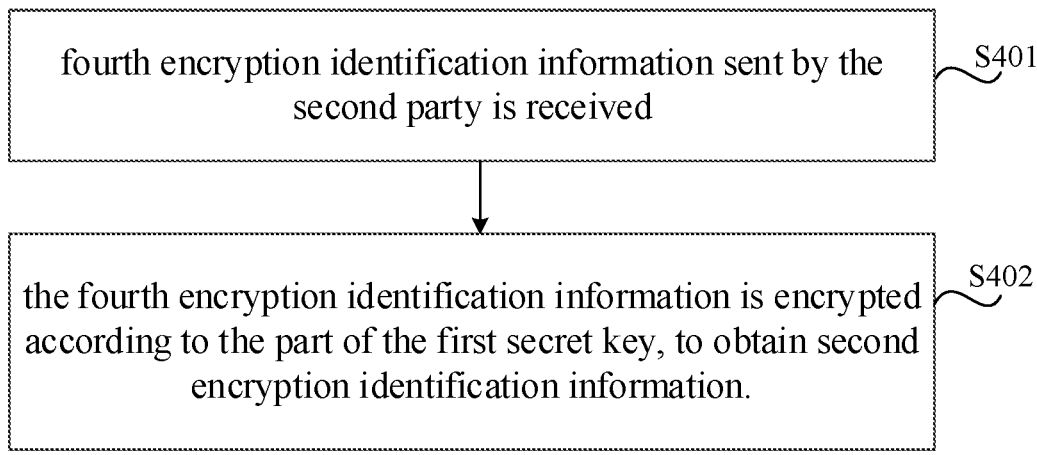
FIG. 4 is a flowchart of a method for obtaining second encryption identification information of a second party according to an exemplary embodiment.

FIG. 4 is a flowchart of a method for obtaining the second encryption identification information of the second party according to an exemplary embodiment. As shown in FIG. 4, the method includes S401 and S402.

At S401, fourth encryption identification information sent by the second party is received. The fourth encryption identification information is obtained through encrypting original identification information of the second party by the second party according to the part of the second secret key.

At S402, the fourth encryption identification information is encrypted according to the part of the first secret key, to obtain second encryption identification information.

The original identification information of the second party may be multiple, and for each original identification information, the second party can encrypt the original identification information according to the part of the second secret key, to obtain the fourth encryption identification information corresponding to the original identification information. Exemplarily, the second party can send a set formed by the fourth encryption identification information after the random arrangement to the first party.

For each fourth encryption identification information, the first party may encrypt the fourth encryption identification information according to the part of the first secret key, to obtain the second encryption identification information encrypted according to the part of the first secret key and the part of the second secret key. Exemplarily, the first party can send a set formed by the plurality of the second encryption identification information after random arrangement to the second party.

In this way, both the first party and the second party can obtain the second encryption identification information of the second party. Moreover, the fourth encryption identification information is encrypted according to the part of the second secret key of the second party, so that the first party cannot know the original identification information of the second party through the fourth encryption identification information, and the leakage of the original information of the second party is not caused.

The embodiment in which the sequence of the encryption identification information is randomly arranged and then sent to the opposite party is provided above, and a reason for randomly arranging the sequence of the encryption identification information is explained below.

Assuming that the first party does not randomly arrange the sequence of the set formed by the third encryption identification information and directly sends it to the second party, the second party encrypts the third encryption identification information according to the part of the second secret key and then sends, in the same arrangement sequence, the first encryption identification information to the first party, then the first party can know a mapping relationship between the first encryption identification information and the original identification information. For example, the original identification information of the first party includes xA, and the corresponding third encryption identification information is $x_A^{s1}$, the first encryption identification information is $x_A^{s1t1}$, and the first party can know that the first encryption identification information $x_A^{s1t1}$ corresponds to the original identification information xA.

The first party can also obtain the second encryption identification information of the second party, and if the first encryption identification information which is the same as the second encryption identification information of the second party exists, for example, the first encryption identification information $x_A^{s1t1}$ is the same as one piece of the second encryption identification information of the second party, then the first party can know that the second party also has information of a user whose original identification information is xA, so that information leakage is easily caused. Therefore, preferably, the sequence of the encryption identification information may be randomly arranged and then sent to the opposite party, so that the condition of information leakage is avoided, and the information security is further improved. It should be noted that the manner of encrypting the secret key as a power is merely illustrative, and the present disclosure does not limit the mode of encryption processing. For example, encryption modes, such as encrypting the identification information by the hash encryption algorithm according to the secret key, can be adopted.

Two exemplary embodiments for obtaining the target identification information union set are described below.

Figure 5:
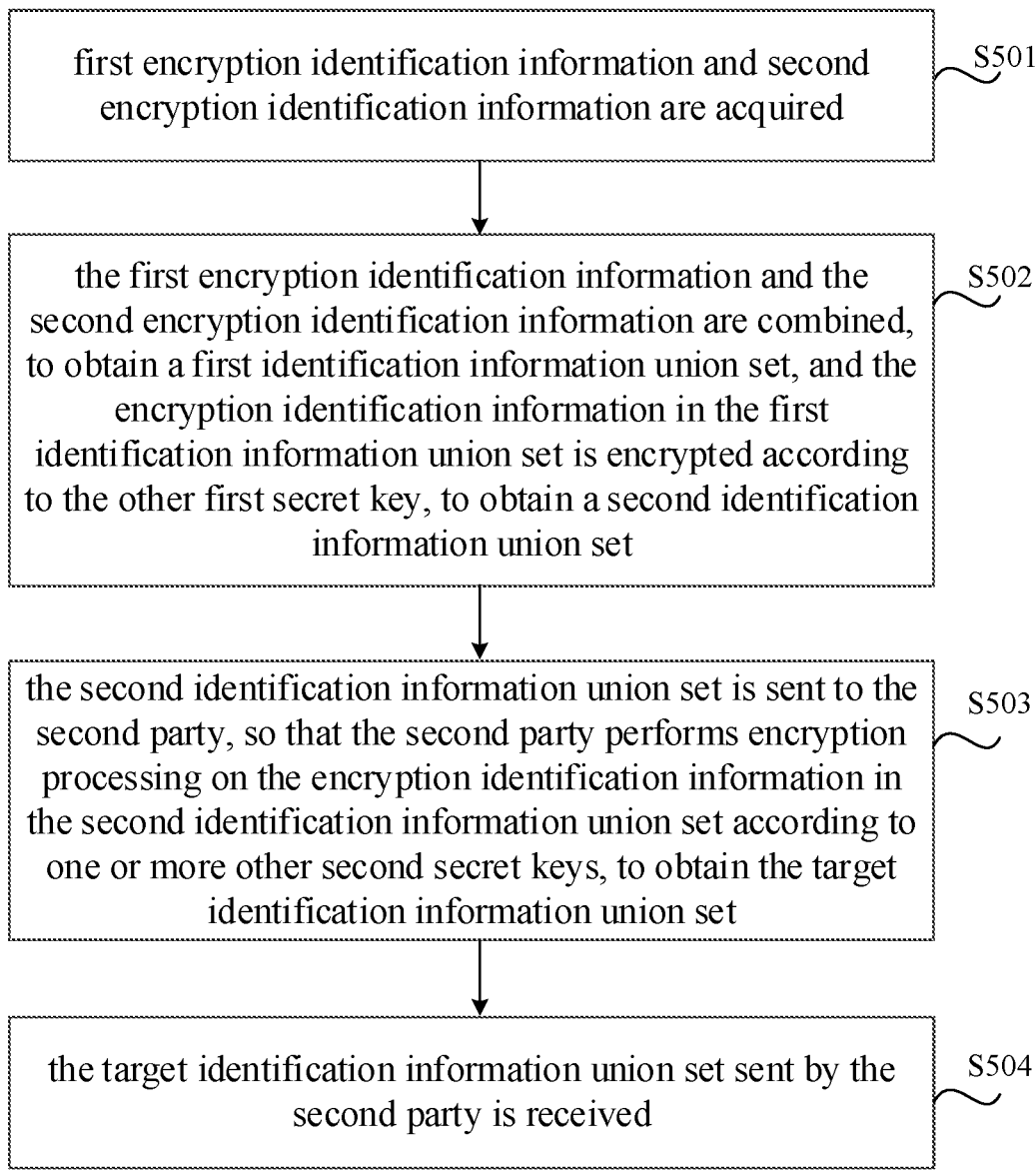
FIG. 5 is a flowchart of a method for acquiring a target identification information union set according to an exemplary embodiment.

FIG. 5 is a flowchart of a method for obtaining the target identification information union set according to an exemplary embodiment. As shown in FIG. 5, the method may include S501 to S504.

At S501, first encryption identification information and second encryption identification information are acquired.

At S502, the first encryption identification information and the second encryption identification information are combined, to obtain a first identification information union set, and the encryption identification information in the first identification information union set is encrypted according to the other first secret key, to obtain a second identification information union set.

The first identification information union set includes the first encryption identification information of the first party and the second encryption identification information of the second party. For each encryption identification information in the first identification information union set, the first party can perform encryption processing on the encryption identification information according to the other first secret key, to obtain the second identification information union set.

The other first secret key includes the first secret key in the plurality of the first secret keys other than the part of the first secret key, for example, the part of the first secret key is s1, then the other first secret key includes s2 and s3.

At S503, the second identification information union set is sent to the second party, so that the second party performs encryption processing on the encryption identification information in the second identification information union set according to one or more other second secret keys, to obtain the target identification information union set.

Exemplarily, the first party can send the second identification information union set after random arrangement to the second party. One or more other second secret keys includes the second secret key in the plurality of the second secret keys other than the part of the second secret key, for example, the part of the second secret key is t1, then one or more other second secret keys includes t2 and t3. Exemplarily, the second party can send the randomly arranged target identification information union set to the first party.

At S504, the target identification information union set sent by the second party is received.

Therefore, both the first party and the second party can obtain the target identification information union set.

Through the technical aspect above, firstly, the first party encrypts the encryption identification information in the first identification information union set according to one or more other first secret key, to obtain the second identification information union set, and then the second party encrypts the encryption identification information in the second identification information union set according to one or more other second secret keys, to obtain the target identification information union set. In this way, the target encryption identification information in the target identification information union set is obtained by encrypting according to all the secret keys of the first party and all the secret keys of the second party, and one party cannot know the original identification information of the opposite party from the target identification information union set, so that the condition of information leakage is avoided.

Figure 6:
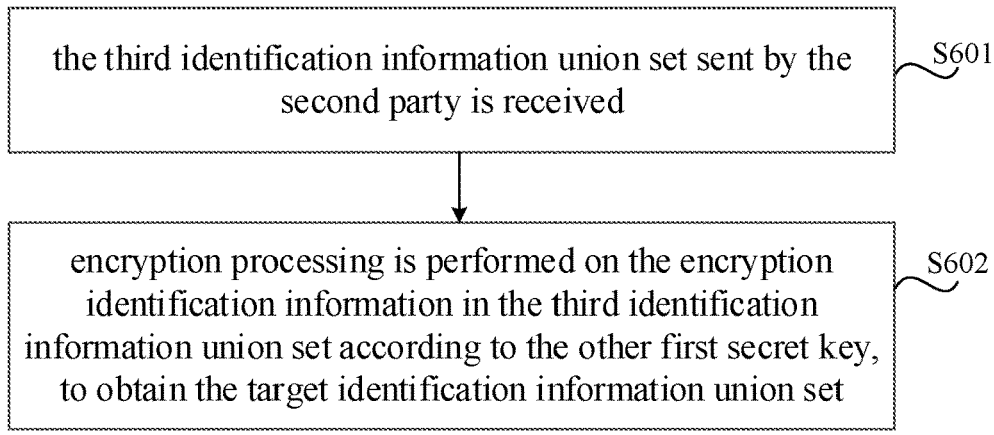
FIG. 6 is a flowchart of a method for acquiring a target identification information union set according to another exemplary embodiment.

FIG. 6 is a flowchart of a method for obtaining the target identification information union set according to another exemplary embodiment. As shown in FIG. 6, the method may include S601 and S602.

At S601, the third identification information union set sent by the second party is received.

The third identification information union set is obtained through encrypting, by the second party, the encryption identification information in the first identification information union set according to one or more other second secret keys, and the first identification information union set is obtained by combining the first encryption identification information and the second encryption identification information.

In this embodiment, the first encryption identification information and the second encryption identification information can be combined by the second party, to obtain the first identification information union set. For each encryption identification information in the first identification information union set, the second party can first perform encryption processing on the encryption identification information according to one or more other second secret keys, to obtain the third identification information union set. One or more other second secret keys includes the second secret key in the plurality of the second secret keys other than the part of the second secret key. Exemplarily, the second party can send the third identification information union set after random arrangement to the first party.

At S602, encryption processing is performed on the encryption identification information in the third identification information union set according to the other first secret key, to obtain the target identification information union set.

The other first secret key includes the first secret key in the plurality of the first secret keys other than the part of the first secret key. For each encryption identification information in the third identification information union set, the first party can encrypt the encryption identification information according to the other first secret key. The first party can send the target identification information union set obtained to the second party, so that both the first party and the second party can obtain the target identification information union set.

Through the technical solutions above, firstly, the second party encrypts the encryption identification information in the first identification information union set according to one or more other second secret keys, to obtain the third identification information union set, and then the first party encrypts the encryption identification information in the third identification information union set according to the other first secret key, to obtain the target identification information union set. In this way, the target encryption identification information in the target identification information union set is obtained by encrypting according to all the secret keys of the first party and all the secret keys of the second party, and one party cannot obtain the original identification information of the opposite party from the target identification information union set, so that the condition of information leakage is avoided.

Figure 7:
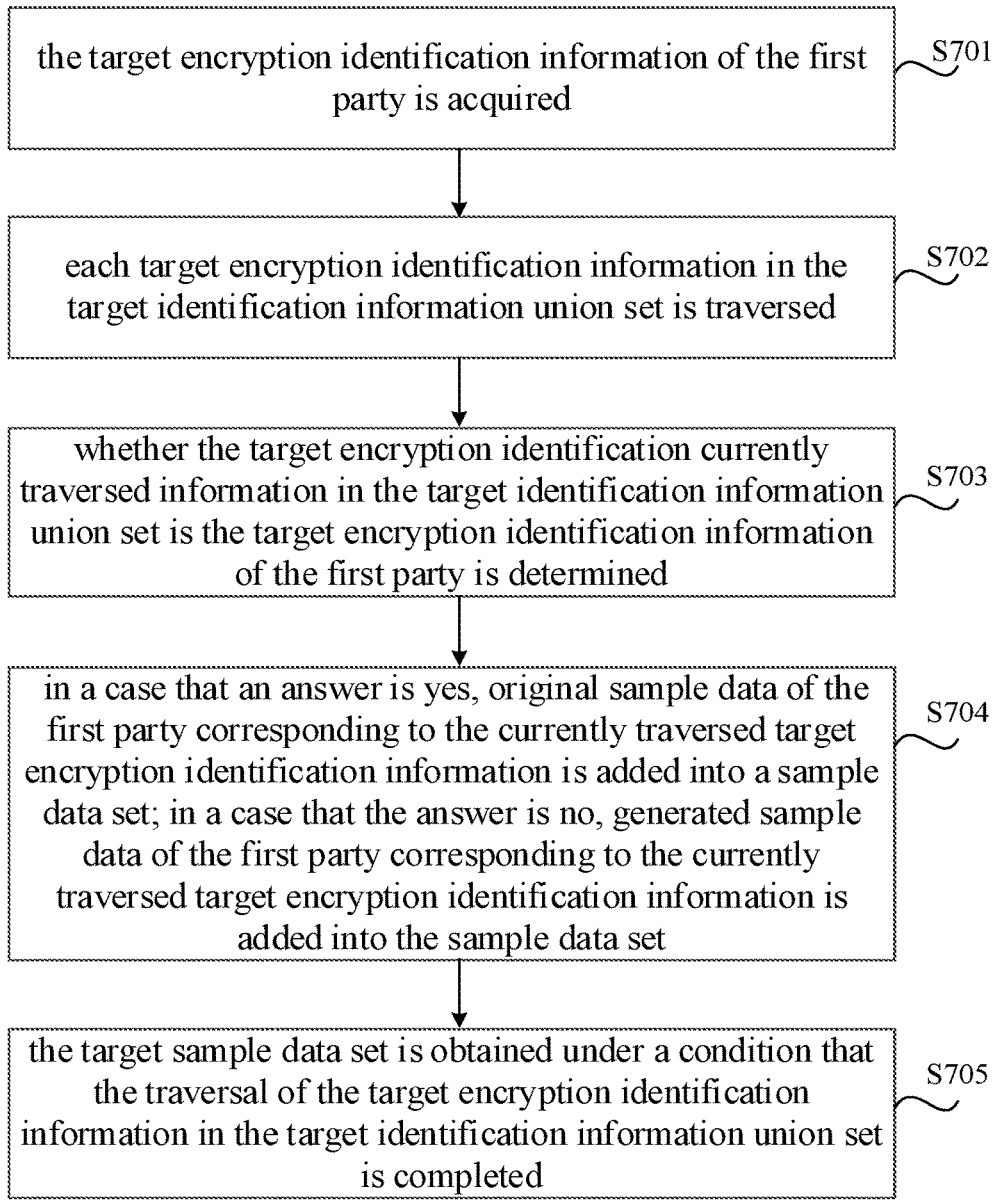
FIG. 7 is a flowchart of a method for determining, according to a target identification information union set, a target sample data set for training a joint training model according to an exemplary embodiment.

FIG. 7 is a flowchart illustrating a method for determining a target sample data set for training a joint training model according to the target identification information union set according to an exemplary embodiment. As shown in FIG. 7, the method may include S701 to S705.

At S701, the target encryption identification information of the first party is acquired.

The target encryption identification information of the first party is obtained by encrypting the original identification information of the first party according to the secret key of the first party and the secret key of the second party.

At S702, each target encryption identification information in the target identification information union set is traversed.

At S703, whether the target encryption identification currently traversed information in the target identification information union set is the target encryption identification information of the first party is determined.

At S704, in a case that an answer is yes, original sample data of the first party corresponding to the currently traversed target encryption identification information is added into a sample data set; in a case that the answer is no, generated sample data of the first party corresponding to the currently traversed target encryption identification information is added into the sample data set.

If the currently traversed target encryption identification information is the target encryption identification information of the first party, it is indicated that the first party has the original identification information corresponding to the target encryption identification information, and then the corresponding original sample data can be added into the sample data set. If the currently traversed target encryption identification information is not the target encryption identification information of the first party, it is indicated that the first party does not have the original identification information corresponding to the target encryption identification information, and then the corresponding generated sample data can be added into the sample data set. For example, a data distribution condition of the sample data set after the generated sample data is added, which can be the same or different within a certain range compare with a data distribution condition of the sample data set formed by the original sample data, to avoid a problem that the generated sample data causes the sample data set to be inaccurate, and to avoid, as much as possible, influence of the generated sample data on the performance of the joint training model.

If the currently traversed target encryption identification information is not the target encryption identification information of the first party, the original identification information corresponding to the target encryption identification information is data of the second party, but due to the fact that the target encryption identification information is encrypted through the secret keys of the two parties at the same time, the first party cannot know the actual original identification information of the second party, and there will be no information leakage.

At S705, the target sample data set is obtained under a condition that the traversal of the target encryption identification information in the target identification information union set is completed.

Through the solution above, the target sample data set for training the joint training model can be determined according to the target identification information union set, and the identification information intersection of the first party and the second party does not need to be determined in advance as in the related technology, thereby preventing one party from knowing which users the opposite party has through the intersection, and moreover, the target encryption identification information in the target identification information union set is obtained by encrypting according to the secret keys of the two parties, so when the target sample data set is constructed, one party cannot know the original identification information of the opposite party, and the data security can be improved.

In one embodiment, the secret key of the first party includes a plurality of the first secret keys; acquiring the target encryption identification information of the first party at S701 can include:

encrypting the original identification information of the first party according to at least one first secret key, to obtain fifth encryption identification information; sending the fifth encryption identification information to the second party, so that the second party encrypts the fifth encryption identification information according to the secret key of the second party, to obtain sixth encryption identification information; receiving sixth encryption identification information sent by the second party, and determining the target encryption identification information of the first party according to the sixth encryption identification information.

The at least one first secret key may include all of the first secret keys in the plurality of the first secret keys, or it does not include all of the first secret keys. In the process of obtaining the first encryption identification information of the first party, the first party firstly encrypts the original identification information according to a part of the first secret key, and in order to further improve the data security, encrypting using the same secret key is avoided, and the at least one first secret key can be different from the part of the first secret key as mentioned above, for example, the part of the first secret key is s1, and the at least one first secret key can be s2.

The first party firstly encrypts the original identification information according to the at least one first secret key, to obtain the fifth encryption identification information, and then it sends the fifth encryption identification information to the second party. Since the fifth encryption identification information is encrypted through the first secret key of the first party, the second party cannot know the original identification information of the first party from the fifth encryption identification information. The second party can encrypt the fifth encryption identification information according to all the secret keys of the second party to obtain the sixth encryption identification information and send it to the first party.

The first party determining the target encryption identification information of the first party according to the sixth encryption identification information can include:

in the case that the at least one first secret key includes all the first secret keys in the plurality of the first secret keys, the sixth encryption identification information is determined as the target encryption identification information of the first party;

in the case that the at least one first secret key does not include all the first secret keys in the plurality of the first secret keys, the sixth encryption identification information is encrypted according to the first secret key in the plurality of the first secret keys other than the at least one first secret key, to obtain the target encryption identification information of the first party.

If the at least one first secret key includes all the first secret keys in the plurality of the first secret keys, then the sixth encryption identification information is obtained by performing encryption processing according to all the secret keys of the first party and all the secret keys of the second party, and the sixth encryption identification information can be determined as the target encryption identification information of the first party. If the at least one first secret key does not include all the secret first keys in the plurality of the first secret keys, the sixth encryption identification information received by the first party has not been encrypted by all the first secret keys, and the first party can encrypt the sixth encryption identification information according to the first secret key in the plurality of the first secret keys other than the at least one first secret key, then the target encryption identification information of the first party that has been encrypted according to all the secret keys of the first party and all the secret keys of the second party can be obtained.

According to the technical solutions above, when acquiring the target encryption identification information of the first party, the fifth encryption identification information that is processed by the at least one first secret key is sent to the second party, and the second party cannot know the original identification information of the first party from the fifth encryption identification information, so that information leakage cannot be caused. After acquiring the target encryption identification information of the first party, it is possible to determine which of the target identification information union set is the target encryption identification information of the first party, so as to construct the target sample data set according to the target identification information.

The process that the first party obtains the target encryption identification information of the first party is introduced above, and a manner by which the second party obtains the target encryption identification information of the second party is similar to that. The second party can encrypt the original identification information of the second party according to at least one second secret key, to obtain seventh encryption identification information, and then it sends the seventh encryption identification information to the first party. The first party can encrypt the seventh encryption identification information according to all the secret keys of the first party to obtain eighth encryption identification information and send it to the second party. The second party can determine target encryption identification information of the second party according to the eighth encryption identification information. If the at least one second secret key includes all the second secret keys of the second party, the eighth encryption identification information can be determined as target encryption identification information of the second party, and if the at least one second key does not include all the second secret keys of the second party, the second party can encrypt the eighth encryption identification information according to the second secret key in the plurality of the second secret keys other than the at least one second secret key, to obtain the target encryption identification information of the second party.

Then, the second party can determine a sample data set of the second party for training the joint training model according to the target identification information union set. The second party can traverse each target encryption identification information in the target identification information union set, and if the currently traversed target encryption identification information is the target encryption identification information of the second party, original sample data of the second party corresponding to the currently traversed target encryption identification information can be added into the sample data set, and if the currently traversed target encryption identification information is not the target encryption identification information of the second party, generated sample data of the second party corresponding to the currently traversed target encryption identification information can be added into the sample data set, and the sample data set of the second party for training the joint training model can be obtained under the condition that the traversal of the target encryption identification information in the target identification information union set is completed.

During training, the joint training model is usually trained in batches, different batches are trained by adopting different sample data, and in a training process of a specified batch, the first party adopts sample data of the first party of the specified batch, and the second party adopts sample data of the second party of the specified batch, and the target encryption identification information corresponding to the sample data respectively adopted by the two parties is the same for the same batch. Exemplarily, the target identification information union set includes $\alpha$, $\beta$, $\gamma$, $\delta$ four pieces of target encryption identification information, for example, in a training process of one batch, the first party adopts sample data of the first party respectively corresponding to $\alpha$ and $\beta$, the second party also adopts sample data of the second party respectively corresponding to $\alpha$ and $\beta$, and in a of training process of a next batch, the first party adopts sample data of the first party respectively corresponding to $\gamma$ and $\delta$, the second party also adopts sample data of the second party respectively corresponding to $\gamma$ and $\delta$. That is, the target encryption identification information corresponding to the sample data respectively adopted by the two parties is the same for the same batch, and the sample data corresponding to which target encryption identification information is adopted in one batch can be agreed in advance by the two parties.

The sample data corresponding to the target encryption identification information in the target identification information union set can be divided into four types, and the sample data corresponding to the target encryption identification information can be the sample data of the first party or the sample data of the second party.

For a first type, the first party and the second party do not actually have original identification information corresponding to the target encryption identification information, the first party provides generated sample data, and the second party also provides generated sample data. Taking an example where the original identification information is the original identification information of the first party, but the original identification information is not the identification information actually owned by the first party, and it may be untrue identification information generated by the first party for an aim of increasing a quantity of the identification information, then for the first party, since the original identification information is not its actually owned identification information, the sample data provided by the first party is generated sample data, and the second party may not actually have the original identification information, so the sample data provided by the second party is also generated sample data. The sample data of this type may be denoted as (xf, yf), in which xf represents generated feature information, the xf may be the generated sample data provided by the passive party in the first party and the second party, yf represents generated label information, and the yf may be the generated sample data provided by the active party in the first party and the second party.

For a second type, the first party does not actually own the original identification information corresponding to the target encryption identification information, the second party actually own the original identification information, then the first party provides the generated sample data, the second party provides the original sample data, and the original sample data is actual sample data corresponding to the original identification information owned by the second party. Under a condition that the first party is the passive party of the joint training model and the second party is the active party of the joint training model, the sample data of this type can be recorded as (xf, yt), in which the xf represents generated feature information, the xf can be the generated sample data provided by the first party, yt represents original label information, and the yt can be the original sample data provided by the second party.

For a third type, the first party actually own the original identification information corresponding to the target encryption identification information, the second party does not actually own the original identification information, then the first party provides the original sample data, the original sample data is the actual sample data corresponding to the original identification information owned by the first party, and the second party provides the generated sample data. Under a condition that the first party is the active party of the joint training model and the second party is the passive party of the joint training model, the sample data of this type can be recorded as (xt, yf), in which xt represents original feature information, the xt can be the original sample data provided by the first party, yf represents the generated label information, and the yf can be the generated sample data provided by the second party.

For a fourth type, both the first party and the second party actually own the original identification information corresponding to the target encryption identification information, the first party provides the original sample data, and the second party also provides the original sample data. The sample data of this type may be denoted as (xt, yt), in which xt represents original feature information, the xt may be the original sample data provided by the passive party in the first party and the second party, yt represents the original tag information, and the yt may be the original sample data provided by the active party in the first party and the second party.

The method for data protection provided by the present disclosure is described below in an embodiment, and it should be noted that the embodiment is merely exemplary. For example, a set formed by the original identification information of the first party is SA, the set SA may include nA pieces of original identification information, for example, including original identification information xA. A set formed by the original identification information of the second party is SB, the set SB may include nB pieces of original identification information, for example, including original identification information xB. The plurality of the first secret keys include s1, s2 and s3, the plurality of the second secret keys include t1, t2 and t3, and this embodiment will be described by taking a case, in which the secret key is encrypted as power, as an example. In addition, in one embodiment, in order to avoid overlarge data after the secret key is encrypted as power, information after power encryption can be divided by a prime number p, and a numerical value of the prime number p can be agreed in advance by the two parties.

The first encryption identification information of the first party can be obtained through following steps (1) and (2).

(1) The first party performs encryption processing on the original identification information xA according to the part of the first secret key s1, to obtain the corresponding third encryption identification information $x_A^{s1}$, other original identification information in the set SA is similar to that, and the first party sends the set $S_A^{s1}$ formed by the plurality of the third encryption identification information to the second party.

(2) The second party encrypts the third encryption identification information $x_A^{s1}$ according to the part of the second secret key t1, to obtain the corresponding first encryption identification information $x_A^{s1t1}$, other third encryption identification information in the set $S_A^{s1}$ is similar to that, and the second party can send the set $S_A^{s1t1}$ formed by the plurality of the first encryption identification information to the first party.

The second encryption identification information of the second party can be obtained by following steps (3) and (4).

(3) The second party encrypts the original identification information xB according to the part of the second secret key t1, to obtain the corresponding fourth encryption identification information $x_B^{t1}$, other original identification information in the set SB is similar to that, and the second party sends the set $S_B^{t1}$ formed by the plurality of the fourth encryption identification information to the first party.

(4) The first party performs encryption processing on the fourth encryption identification information $X_B^{t1}$ according to the part of the first secret key s1, to obtain the corresponding second encryption identification information $X_B^{t1}$ other fourth encryption identification information in the set $S_B^{t1}$ is similar to that, and the first party can send the set $S_B^{s1t1}$ formed by the plurality of the second encryption identification information to the second party.

In an embodiment, the target identification information union set may be obtained by steps (5)-(7) as follows.

(5) The first party combines the first encryption identification information in the set $S_A^{s1t1}$ with the second encryption identification information in the set $S_B^{s1t1}$, to obtain the first identification information union set $(S_A \cup S_B)^{s1t1}$.

(6) The first party performs encryption processing on the encrypted identification information in the union set $(S_A \cup S_B)^{s1t1}$ according to the other first secret key s2 and s3 to obtain the second identification information union set $(S_A \cup S_B)^{s1s2s3t1}$ and sends it to the second party. The second identification information union set $(S_A \cup S_B)^{s1s2s3t1}$ includes: $x_A^{s1s2s3t1}$ obtained by processing the encryption identification information $x_A^{s1t1}$, and $s_B^{s1s2s3t1}$ obtained by processing the encryption identification information $x_B^{s1t1}$.

(7) The second party performs encryption processing on the encryption identification information in the second identification information union set $(S_A \cup S_B)^{s1s2s3t1}$ according to the other second secret keys t2 and t3 to obtain the target identification information union set $(S_A \cup S_B)^{s1s2s3t1t2t3}$ and sends it to the first party. The target identification information union set includes the target encryption identification information $x_A^{s1s2s3t1t2t3}$ of the first party and the target encryption identification information $X_B^{s1s2s3t1t2t3}$.

In another embodiment, the target identification information union set may be obtained by steps (8)-(10) as follows.

(8) The second party combines the first encryption identification information in the set is with the second encryption identification information in the set $S_B^{s1t1}$, to obtain the first identification information union set $(S_A \cup S_B)^{s1t1}$.

(9) The second party performs encryption processing on the encryption identification information in the union set $(S_A \cup S_B)^{s1t1}$ according to the other second secret keys t2 and t3 to obtain the third identification information union set $(S_A \cup S_B)^{s1t1t2t3}$ and sends it to the first party. The third identification information union set $(S_A \cup S_B)^{s1t1t2t3}$ includes $x_A^{s1t1t2t3}$ obtained by processing the encryption identification information $x_A^{s1t1}$, and $x_B^{s1t1t2t3}$ obtained by processing the encryption identification information $X_B^{s1t1}$.

(10) The first party performs encryption processing on the encryption identification information in the third identification information union set $(S_A \cup S_B)^{s1t1t2t3}$ according to the other first secret key s2 and s3, to obtain the target identification information union set $(S_A \cup S_B)^{s1s2s3t1t2t3}$.

The process of acquiring the target encryption identification information of the first party by the first party can be as described in steps (11)-(13).

(11) The first party performs encryption processing on the original identification information xA according to at least one secret first key s2 to obtain corresponding fifth encryption identification information $x_A^{s2}$ and sends it to the second party.

(12) The second party performs encryption processing on the fifth encryption identification information $x_A^{s2}$ according to the plurality of the second secret keys t1, t2 and t3 to obtain corresponding sixth encryption identification information $x_A^{s2t1t2t3}$ and sends it to the first party.

(13) The first party performs encryption processing on the sixth encryption identification information $x_A^{s2t1t2t3}$ according to the first secret keys s1 and s3 other than s2, to obtain the target encryption identification information $x_A^{s1s2s3t1t2t3}$ corresponding to the original identification information xA.

After the first part acquires the target encryption identification information of the first party, it can traverse each target encryption identification information in the target identification information union set $(S_A \cup S_B)^{s1s2s3t1t2t3}$, and for example, what is currently traversed is target encryption identification information $x_A^{s1s2s3t1t2t3}$, which is the target encryption identification information of the first party, and original sample data of the first party corresponding to the target encryption identification information $x_A^{s1s2s3t1t2t3}$ can be added into the sample data set, and for example, what is currently traversed is target encryption identification information $X_B^{s1s2s3t1t2t3}$, which is not the target encryption identification information of the first party, and generated sample data of the first party corresponding to the target encryption identification information $X_B^{s1s2s3t1t2t3}$ can be added into the sample data set. Under the condition that traversal of the target encryption identification information in the is completed, the target target identification information union set $(S_A \cup S_B)^{s1s2s3t1t2t3}$ is completed, the target sample data set can be obtained.

The method for data protection provided by the present disclosure is described below in a complete embodiment, and it should be noted that the embodiment is merely exemplary, and an execution sequence of each step is also merely exemplary, which does not constitute a limitation on the embodiments of the present disclosure.

Figure 8:
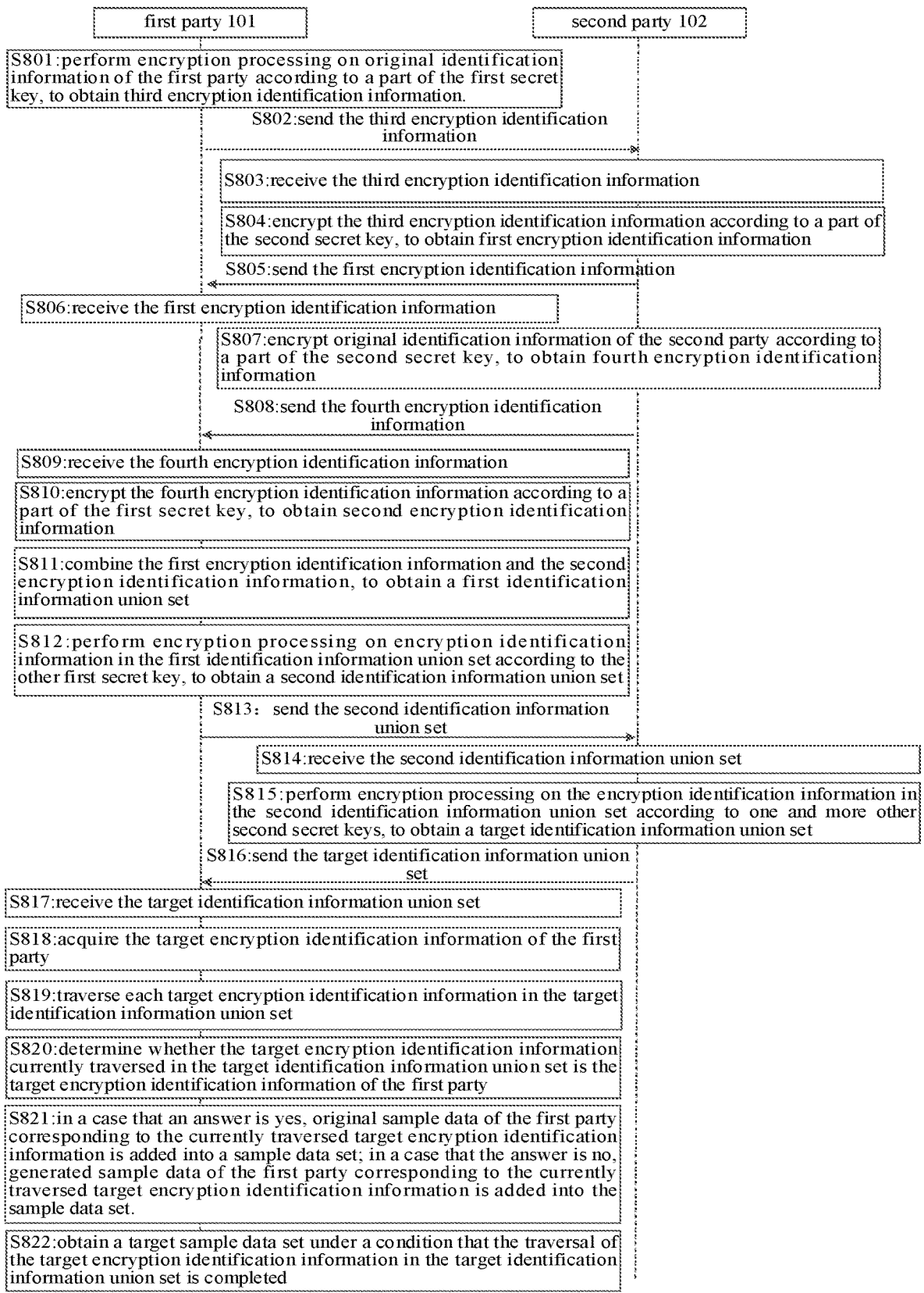
FIG. 8 is a diagram of interaction between a first party and a second party in a method for data protection according to an exemplary embodiment.

FIG. 8 is a diagram showing interaction between a first party 101 and a second party 102 in a method for data protection according to an exemplary embodiment, and as shown in FIG. 8, the method for data protection may include S801 to S822.

At S801, the first party 101 performs encryption processing on original identification information of the first party according to a part of the first secret key, to obtain third encryption identification information.

At S802, the first party 101 sends the third encryption identification information to the second party 102.

At S803, the second party 102 receives the third encryption identification information sent by the first party 101.

At S804, the second party 102 encrypts the third encryption identification information according to a part of the second secret key, to obtain first encryption identification information.

At S805, the second party 102 sends the first encryption identification information to the first party 101.

At S806, the first party 101 receives the first encryption identification information sent by the second party 102.

At S807, the second party 102 encrypts original identification information of the second party according to a part of the second secret key, to obtain fourth encryption identification information.

At S808, the second party 102 sends the fourth encryption identification information to the first party 101.

At S809, the first party 101 receives the fourth encryption identification information sent by the second party 102.

At S810, the first party 101 encrypts the fourth encryption identification information according to a part of the first secret key, to obtain second encryption identification information.

At S811, the first party 101 combines the first encryption identification information and the second encryption identification information, to obtain a first identification information union set.

At S812, the first party 101 performs encryption processing on encryption identification information in the first identification information union set according to the other first secret key, to obtain a second identification information union set.

At S813, the first party 101 sends the second identification information union set to the second party 102.

At S814, the second party 102 receives the second identification information union set sent by the first party 101.

At S815, the second party 102 performs encryption processing on the encryption identification information in the second identification information union set according to one and more other second secret keys, to obtain a target identification information union set.

At S816, the second party 102 sends the target identification information union set to the first party 101.

At S817, the first party 101 receives the target identification information union set sent by the second party 102.

At S818, the first party 101 acquires the target encryption identification information of the first party 101.

At S819, the first party 101 traverses each target encryption identification information in the target identification information union set.

At S820, the first party 101 determines whether the target encryption identification information currently traversed in the target identification information union set is the target encryption identification information of the first party.

At S821, in a case that an answer is yes, original sample data of the first party corresponding to the currently traversed target encryption identification information is added into a sample data set; in a case that the answer is no, generated sample data of the first party corresponding to the currently traversed target encryption identification information is added into the sample data set.

At S822, the first party 101 obtains a target sample data set under a condition that the traversal of the target encryption identification information in the target identification information union set is completed.

Therefore, on one hand, the identification information intersection of the first party and the second party does not need to be determined in advance as in the related technology, thereby preventing one party from knowing which users the opposite party has through the intersection, and on the other hand, the identification information is encrypted according to the secret keys of the two parties at the same time, so that one party cannot obtain the original identification information of the opposite party from the target identification information union set, thereby avoiding the information leakage condition, and improving the data security in the joint learning process.

Figure 9:
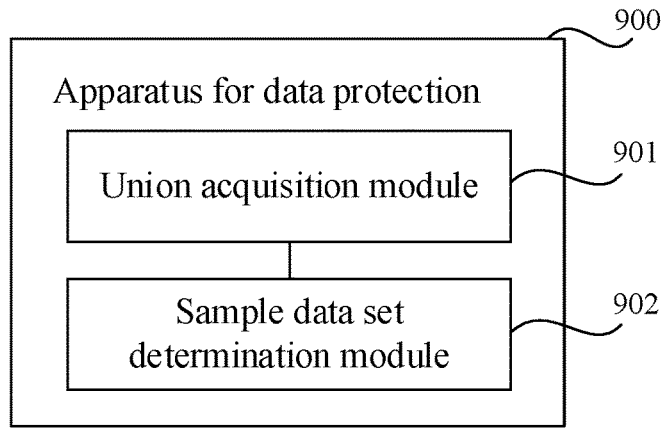
FIG. 9 is a block diagram of an apparatus for data protection according to an exemplary embodiment.

Based on the same inventive concept, the present disclosure further provides an apparatus for data protection, FIG. 9 is a block diagram of an apparatus for data protection according to an exemplary embodiment. As shown in FIG. 9, the device 900 may include:

a union acquisition module 901, used for acquiring a target identification information union set, wherein the target identification information union set includes target encryption identification information of a first party of a joint training model and target encryption identification information of a second party of the joint training model, and the target encryption identification information in the target identification information union set is obtained by encrypting according to a secret key of the first party and a secret key of the second party; and a sample data set determination module 902, used for determining, according to the target identification information union set, a target sample data set for training the joint training model.

In an embodiment, the secret key of the first party includes a plurality of first secret keys, and the secret key of the second party includes a plurality of second secret keys; the target identification information union set is obtained according to first encryption identification information of the first party and second encryption identification information of the second party, the first encryption identification information and the second encryption identification information are obtained by encrypting according to a part of the first secret key in the plurality of the first secret keys and a part of the second secret key in the plurality of the second secret keys.

In an embodiment, the union acquisition module 901 includes: a first acquisition sub-module, used for acquiring the first encryption identification information and the second encryption identification information; a first processing sub-module, used for combining the first encryption identification information and the second encryption identification information to obtain a first identification information union set, and performing encryption processing on the encryption identification information in the first identification information union set according to the other first secret key to obtain a second identification information union set, wherein the other first secret key includes the first secret key in the plurality of the first secret keys other than the part of the first secret key; a first sending sub-module, used for sending the second identification information union set to the second party, to cause the second party to perform encryption processing on the encryption identification information in the second identification information union set according to one and more other second secret keys to obtain the target identification information union set, wherein the other second secret keys includes the second secret key in the plurality of the second secret keys other than the part of the second secret key; and a first receiving sub-module, used for receiving the target identification information union set sent by the second party.

In an embodiment, the union acquisition module 901 includes: a second receiving sub-module, used for receiving a third identification information union set sent by the second party, wherein the third identification information union set is obtained through encrypting, by the second party, the encryption identification information in the first identification information union set according to the other second secret keys, the first identification information union set is obtained by combining the first encryption identification information and the second encryption identification information, and the other second secret keys includes the second secret key in the plurality of the second secret keys other than the part of the second secret key; and a second processing sub-module, which is used for performing encryption processing on the encryption identification information in the third identification information union set according to the other first secret key to obtain the target identification information union set, wherein the other first secret key includes the first secret key in the plurality of the first secret keys other than the part of the first secret key.

In an embodiment, the first encryption identification information is obtained by: encrypting original identification information of the first party according to the part of the first secret key, to obtain third encryption identification information; sending the third encryption identification information to the second party, so that the second party encrypts the third encryption identification information according to the part of the second secret key, to obtain the first encryption identification information.

In an embodiment, the second encryption identification information is obtained by: receiving the fourth encryption identification information sent by the second party, and the fourth encryption identification information is obtained by the second party performing encryption processing on original identification information of the second party according to the part of the second secret key; encrypting the fourth encryption identification information according to the part of the first secret key, to obtain the second encryption identification information.

In an embodiment, the sample data set determination module 902 includes: a second acquisition sub-module, which is used for acquiring the target encryption identification information of the first party; a traversal sub-module, which is used for traversing each target encryption identification information in the target identification information union set; and a judgment sub-module, which is used for determining whether the target encryption identification information currently traversed in the target identification information union set is the target encryption identification information of the first party or not; a sample data adding sub-module, which is used for adding the original sample data of the first party corresponding to the currently traversed target encryption identification information into the sample data set in a case that an answer is yes; and for adding the generated sample data of the first party corresponding to the currently traversed target encryption identification information into the sample data set in a case that the answer is no; and an acquisition sub-module, which is used for obtaining the target sample data set under the condition that the traversal of the target encryption identification information in the target identification information union set is completed.

In an embodiment, the secret key of the first party includes a plurality of first secret keys; the second acquisition sub-module includes: a third processing sub-module, which is used for performing encryption processing on the original identification information of the first party according to at least one first secret key, to obtain fifth encryption identification information; a second sending sub-module, which is used for sending the fifth encryption identification information to the second party, so that the second party encrypts the fifth encryption identification information according to the secret key of the second party, to obtain sixth encryption identification information; and a first determination sub-module, which is used for receiving the sixth encryption identification information sent by the second party, and determining target encryption identification information of the first party according to the sixth encryption identification information.

In an embodiment, the first determination sub-module includes: a second determination sub-module, which is used for determining the sixth encryption identification information as the target encryption identification information of the first party when the at least one first secret key includes all the first secret keys of the plurality of the first secret keys; and a fourth processing sub-module, which is used for encrypting the sixth encryption identification information according to the first secret key in the plurality of the first secret keys other than the at least one first secret key under the condition that the at least one first secret key does not include all the first secret keys in the plurality of the first secret keys, to obtain target encryption identification information of the first party.

In an embodiment, the first party is an active party of the joint training model, and correspondingly, the second party is a passive party of the joint training model; or, the first party is a passive party of the joint training model, and correspondingly, the second party is an active party of the joint training model.

With regard to the device in the above embodiments, a specific manner in which each module performs an operation has been described in detail in embodiments related to the method, which will not be described in detail herein.

Figure 10:
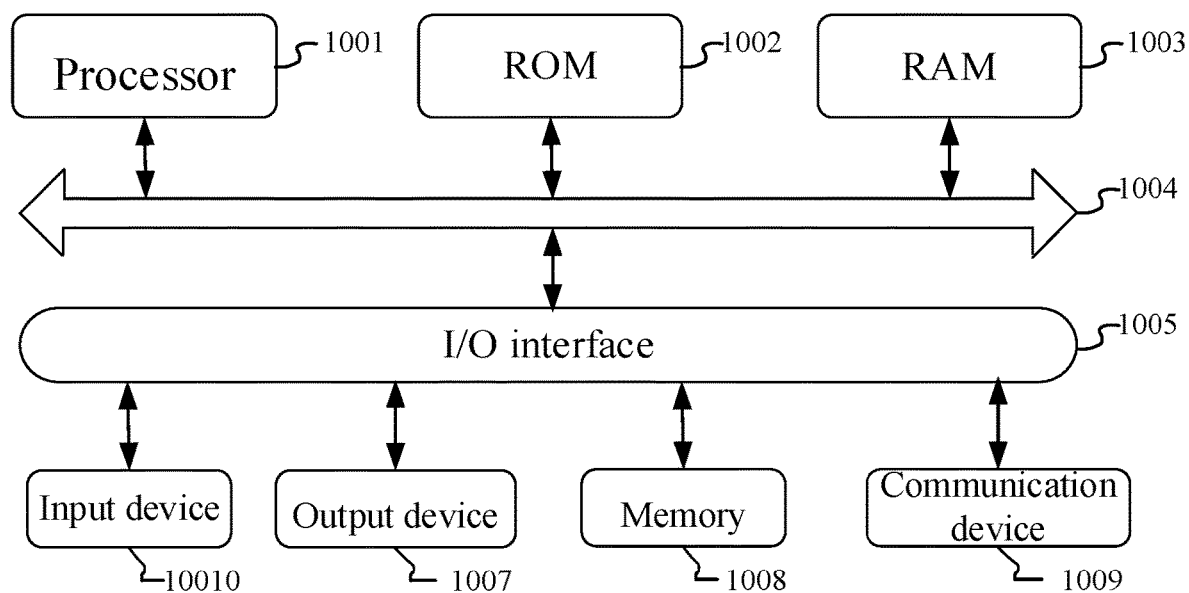
FIG. 10 is a structural schematic diagram of an electronic device according to an exemplary embodiment.

Referring now to FIG. 10, a structural schematic diagram of an electronic device 1000 suitable for implementing embodiments of the present disclosure is shown. A terminal apparatus in the embodiment of the present disclosure may include, but is not limited to, a mobile terminal such as a mobile phone, a notebook computer, a digital broadcast receiver, a PDA (personal digital assistant), a PAD (tablet computer), a PMP (portable multimedia player), a vehicle-mounted terminal (such as a vehicle-mounted navigation terminal), and the like, and a fixed terminal such as a digital TV and a desktop computer. The electronic device shown in FIG. 10 is merely an example, which should not bring any limitation to the functions and use ranges of the embodiment of the present disclosure.

As shown in FIG. 10, the electronic device 1000 may include a processor (e.g., a central processor, a graphics processor, etc.) 1001, which may perform various appropriate actions and processes according to a program stored in a read-only memory (ROM) 1002 or a program loaded into a random-access memory (RAM) 1003 from a memory 1008. In the RAM 1003, various programs and data required for an operation of the electronic device 1000 are also stored. The processor 1001, the ROM 1002, and the RAM 1003 are connected to each other by a bus 1004. An input/output (I/O) interface 1005 is also connected to the bus 1004.

Generally, following devices may be connected to the I/O interface 1005: an input device 1006 including, for example, a touch screen, a touchpad, a keyboard, a mouse, a camera, a microphone, an accelerometer, a gyroscope, etc.; an output device 1007 including, for example, a liquid crystal display (LCD), a speaker, a vibrator, etc.; a memory 1008 including, for example, tape, hard disk, etc.; and a communication device 1009. The communication device 1009 may allow the electronic device 1000 to perform wireless or wired communication with other apparatus to exchange data. Although FIG. 10 shows the electronic device 1000 having various devices, it is to be understood that it is not required to implement or have all of the illustrated devices. More or fewer devices may alternatively be implemented or provided.

In particular, according to embodiments of the present disclosure, the process described above with reference to the flowchart may be implemented as a computer software program. For example, the embodiment of the present disclosure includes a computer program product that includes a computer program carried on a non-transitory computer-readable medium, and the computer program includes a program code for executing the method shown in the flowchart. In such embodiments, the computer program may be downloaded and installed from a network via the communication device 1009, or installed from the memory 1008, or installed from the ROM 1002. When the computer program is executed by the processor 1001, the function defined in the method of the embodiment of the present disclosure is executed.

It should be noted that the computer readable medium of the present disclosure may be a computer readable signal medium or a computer readable storage medium, or any combination of the two. The computer readable storage medium may be, for example, but not limited to, an electrical, magnetic, optical, electromagnetic, infrared, or semiconductor system, device, or component, or any combination thereof. More specific examples of computer-readable storage media may include, but are not limited to, electrically connected by one or more wires, portable computer disk, hard disk, random access memory (RAM), read-only memory (ROM), erasable programmable read-only memory (EPROM or flash memory), optical fiber, portable compact disk read-only memory (CD-ROM), optical storage component, magnetic storage component, or any suitable combination thereof. In the present disclosure, the computer-readable storage medium may be any tangible medium that includes or stores a program, and the program can be used by or in connection with an instruction execution system, device, or component. While in the present disclosure, the computer-readable signal medium may include a data signal propagated in a baseband or as part of a carrier, and the computer-readable program code is carried therein. Such propagated data signals may take a variety of forms, including, but not limited to, electromagnetic signals, optical signals, or any suitable combination thereof. The computer-readable signal medium may also be any computer-readable medium other than the computer-readable storage medium, and the computer-readable signal medium may send, propagate, or transmit a program used by or in connection with an instruction execution system, device, or component. The program code contained on the computer-readable medium can be transmitted by any suitable medium, including but not limited to, electric wires, optical cables, RF (radio frequency) and the like, or any suitable combination of the above.

In some embodiments, the client, the server may communicate using any currently known or future developed network protocol, such as HTTP (Hypertext Transfer Protocol), and may be interconnected with any form or medium of digital data communication (e.g., communication network). Examples of the communication network include local area networks ("LAN"), wide area networks ("WAN"), Internet networks (e.g., the Internet), and end-to-end networks (e.g., Ad hoc end-to-end networks), as well as any currently known or future developed networks.

The computer readable medium mentioned above can be contained in the electronic device; and it can also exist alone and is not assembled into the electronic device.

The computer readable medium carries one or more programs, and when the one or more programs are executed by the electronic device, the electronic device is caused to execute:
  acquiring a target identification information union set, wherein the target identification information union set includes target encryption identification information of a first party of a joint training model and target encryption identification information of a second party of the joint training model, and the target encryption identification information in the target identification information union set is obtained by encrypting according to a secret key of the first party and a secret key of the second party; and determining, according to the target identification information union set, a target sample data set for training the joint training model.

A computer program code for executing an operation of the present disclosure may be written in one or more programming languages, and the programming languages include, but not limited to, object-oriented programming languages, such as Java, Smalltalk, C++, and conventional procedural programming languages, such as "C" languages or similar programming languages. The program code may be executed entirely on the user's computer, executed partly on the user's computer, executed as a stand-alone software package, executed partly on the user's computer and partly on a remote computer, or executed entirely on the remote computer or server. In the case of the remote computer, the remote computer may be connected to the user computer through any type of network, including a local area network (LAN) or a wide area network (WAN), or it may be connected to an external computer (e.g., via the Internet using an Internet Service Provider)).

The flowcharts and block diagrams in the company drawings illustrate the architecture, functionality, and operation of possible implementations of systems, methods, and computer program products in accordance with various embodiments of the present disclosure. In this regard, each block in the flowcharts or block diagrams may represent a module, a program segment, or a portion of the code, and the module, the program segment, or the portion of the code include one or more executable instructions for implementing a specified logical function. It should also be noted that, in some alternative implementations, functions noted in the block may occur out of the order noted in the drawings. For example, two blocks represented in succession may, in fact, be executed substantially in parallel, and they may sometimes be executed in a reverse order, depending upon functions involved. It is also noted that each block of the block diagrams and/or flowcharts, and combinations of blocks in the block diagrams and/or flowcharts, may be implemented with an application-specific hardware-based system that executes specified functions or operations, or may be implemented with a combination of application-specific hardware and computer instructions.

The modules involved in the embodiments of the present disclosure may be implemented by means of software or may be implemented by means of hardware. A name of the module does not constitute a limitation on the module itself in some cases. For example, the union set acquisition module can also be described as "a target identification information union set acquisition module".

The functions described herein may be executed at least in part by one or more hardware logic components. For example, non-limiting, exemplary types of the hardware logic components that may be used include: a field programmable gate array (FPGA), an application specific integrated circuit (ASIC), an application specific standard par (ASSP), an on-chip system (SOC), a complex programmable logic device (CPLD), and the like.

In the context of the present disclosure, a machine-readable medium may be a tangible medium that may contain or store a program used by or in connection with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor system, device, or apparatus, or any suitable combination of the foregoing. More specific examples of a machine-readable storage medium may include electrically connected by one or more wires, portable computer disk, hard disk, random access memory (RAM), read-only memory (ROM), erasable programmable read-only memory (EPROM or flash memory), optical fiber, portable compact disk read-only memory (CD-ROM), optical storage component, magnetic storage component, or any suitable combination thereof.

According to one or more embodiments of the present disclosure, Example 1 provides a method for data protection, and the method includes:
  acquiring a target identification information union set, wherein, the target identification information union set includes target encryption identification information of a first party of a joint training model and target encryption identification information of a second party of the joint training model, and the target encryption identification information in the target identification information union set is obtained by encrypting according to a secret key of the first party and a secret key of the second party;

and determining, according to the target identification information union set, a target sample data set for training the joint training model.

According to one or more embodiments of the present disclosure, Example 2 provides a method of Example 1, and the secret key of the first party includes a plurality of first secret keys, and the secret key of the second party includes a plurality of second secret keys;

the target identification information union set is obtained according to first encryption identification information of the first party and second encryption identification information of the second party, wherein the first encryption identification information and the second encryption identification information are obtained by encrypting according to a part of the first secret key in the plurality of the first secret keys and a part of the second secret key in the plurality of the second secret keys.

According to one or more embodiments of the present disclosure, Example 3 provides a method of Example 2, and obtaining the target identification information union set includes:

acquiring the first encryption identification information and the second encryption identification information;

combining the first encryption identification information and the second encryption identification information to obtain a first identification information union set, and performing encryption processing on encryption identification information in the first identification information union set according to one or more the other first secret key to obtain a second identification information union set, wherein, the other first secret key includes the first secret key in the plurality of the first secret keys other than the part of the first secret key;

sending the second identification information union set to the second party, so that the second party performs encryption processing on encryption identification information in the second identification information union set according to one or more other second secret keys to obtain the target identification information union set, wherein the other second secret keys includes the second secret key in the plurality of the second secret keys other than the part of the second secret key;

and receiving the target identification information union set sent by the second party.

According to one or more embodiments of the present disclosure, Example 4 provides a method of Example 2, and obtaining the target identification information union set includes:

receiving a third identification information union set sent by the second party, wherein, the third identification information union set is obtained by performing encryption processing on encryption identification information in the first identification information union set according to one and more other second secret keys, the first identification information union set is obtained by combining the first encryption identification information and the second encryption identification information, and one or more other second secret keys includes the second secret key in the plurality of the second secret keys other than the part of the second secret key;

and performing encryption processing on encryption identification information in the third identification information union set according to the other first secret key to obtain the target identification information union set, wherein the other first secret key includes the first secret key in the plurality of the first secret keys other than the part of the first secret key.

According to one or more embodiments of the present disclosure, Example 5 provides a method of any example of Example 2 to Example 4, and the first encryption identification information is obtained by:

performing encryption processing on original identification information of the first party according to the part of the first secret key, to obtain third encryption identification information;

sending the third encryption identification information to the second party, so that the second party performs encryption processing on the third encryption identification information according to the part of the second secret key, to obtain the first encryption identification information.

According to one or more embodiments of the present disclosure, Example 6 provides a method of any example of Example 2 to Example 4, and the second encryption identification information is obtained by:

receiving fourth encryption identification information sent by the second party, wherein, the fourth encryption identification information is obtained by the second party performing encryption processing on original identification information of the second party according to the part of the second secret key;

and performing encryption processing on the fourth encryption identification information according to the part of the first secret key, to obtain the second encryption identification information.

According to one or more embodiments of the present disclosure, Example 7 provides a method of Example 1, and determining, according to the target identification information union set, the target sample data set for training the joint training model includes: acquiring target encryption identification information of the first party;

traversing each target encryption identification information in the target identification information union set;

determining whether the target encryption identification information currently traversed in the target identification information union set is target encryption identification information of the first party or not;

in a case that an answer is yes, adding original sample data of the first party corresponding to the currently traversed target encryption identification information into a sample data set; in a case that the answer is no, adding generated sample data of the first party corresponding to the currently traversed target encryption identification information into the sample data set;

and in a case that traversal of the target encryption identification information in the target identification information union set is completed, obtaining the target sample data set.

According to one or more embodiments of the present disclosure, Example 8 provides a method of Example 7, and the secret key of the first party includes a plurality of first secret keys; acquiring the target encryption identification information of the first party includes:

performing encryption processing on original identification information of the first party according to at least one of the first secret keys, to obtain fifth encryption identification information;

sending the fifth encryption identification information to the second party, so that the second party performs encryption processing on the fifth encryption identification information according to the key of the second party, to obtain sixth encryption identification information;

receiving the sixth encryption identification information sent by the second party, and determining the target encryption identification information of the first party according to the sixth encryption identification information.

According to one or more embodiments of the present disclosure, Example 9 provides a method of Example 8, and determining the target encryption identification information of the first party according to the sixth encryption identification information includes:

in a case that the at least one first secret key includes all the first secret keys in the plurality of the first secret keys, determining the sixth encryption identification information as the target encryption identification information of the first party;

in a case that the at least one first secret key does not include all the first secret keys in the plurality of the first secret keys, performing encryption processing on the sixth encryption identification information according to the first secret key in the plurality of the first secret keys other than the at least one first secret key, to obtain the target encryption identification information of the first party.

According to one or more embodiments of the present disclosure, Example 10 provides a method of Example 1, and the first party is an active party of the joint training model, and correspondingly, the second party is a passive party of the joint training model; or, the first party is a passive party of the joint training model, and correspondingly, the second party is an active party of the joint training model.

According to one or more embodiments of the present disclosure, Example 11 provides a device for data protection, and the device includes:

a union acquisition module, which is used for acquiring a target identification information union set, wherein the target identification information union set includes target encryption identification information of a first party of a joint training model and target encryption identification information of a second party of the joint training model, and target encryption identification information in the target identification information union set is obtained by encrypting according to a secret key of the first party and a secret key of the second party;

and a sample data set determination module, which is used for determining, according to the target identification information union set, a target sample data set for training the joint training model.

According to one or more embodiments of the present disclosure, Example 12 provides a computer readable medium, on which a computer program is stored, and when the program is executed by a processor, steps of the method according to any one of Examples 1-10 are realized.

According to one or more embodiments of the present disclosure, Example 13 provides an electronic device, including:

a memory, on which a computer program is stored;

a processor, which is used for executing the computer program in the memory, so as to realize steps of the method according to any one of Examples 1-10.

The above description is merely a description of the preferred embodiments of the present disclosure and the technical principles used. It should be understood by those skilled in the art that the scope of disclosure involved in the present disclosure is not limited to the technical solutions formed by a specific combination of the above-mentioned technical features, and it also covers other technical solutions formed by any combination of the above-mentioned technical features or equivalent features thereof without departing from the disclosed concept. For example, the above-mentioned features and the technical features disclosed in the present disclosure (but not limited to) having similar functions are replaced with each other.

Further, while various operations are depicted in a particular order, it should not be understood that these operations are required to be executed in the particular order shown or in sequential order. Multitasking and parallel processing may be advantageous in a certain environment. Likewise, although several specific implementation details are included in the above discussion, these should not be construed as limiting the scope of the present disclosure. Certain features described in the context of separate embodiments may also be implemented in combination in a single embodiment. Conversely, various features described in the context of a single embodiment may also be implemented in various embodiments separately or in any suitable sub-combination.

Although the subject matter has been described in language specific to structural features and/or methodological acts, it should be understood that the subject matter defined in the appended claims is not necessarily limited to the particular features or acts described above. Rather, the specific features and acts described above are merely exemplary forms of implementing the claims. With regard to the device in the above embodiments, the specific manner in which each module performs an operation has been described in detail in embodiments related to the method, which will not be described in detail herein.

What is claimed is:

1. A method for data protection, comprising:

acquiring a target identification information union set, the target identification information union set comprising target encryption identification information of a first party of a joint training model and target encryption identification information of a second party of the joint training model, the target encryption identification information in the target identification information union set being obtained by encrypting based on a secret key of the first party and a secret key of the second party; and determining, based on the target identification information union set, a target sample data set for training the joint training model, wherein the secret key of the first party comprises a plurality of first secret keys, the secret key of the second party comprises a plurality of second secret keys, and the target identification information union set is obtained based on first encryption identification information of the first party and second encryption identification information of the second party, the first encryption identification information and the second encryption identification information being obtained by encrypting based on a part of the plurality of the first secret keys and a part of the plurality of the second secret keys; and wherein said acquiring the target identification information union set comprises:

acquiring the first encryption identification information and the second encryption identification information;

combining the first encryption identification information and the second encryption identification information, to obtain a first identification information union set, and performing encryption processing on encryption identification information in the first identification information union set based on one or more other first secret keys, to obtain a second identification information union set, wherein, the one or more other first secret keys comprise one or more first secret keys in the plurality of the first secret keys other than the part of the first secret key; transmitting the second identification information union set to the second party, so that the second party performs encryption processing on encryption identification information in the second identification information union set based on one or more other second secret keys, to obtain the target identification information union set, wherein the one or more other second secret keys comprise one or more second secret keys in the plurality of the second secret keys other than the part of the second secret key; and receiving the target identification information union set transmitted by the second party; or receiving a third identification information union set transmitted by the second party, the third identification information union set being obtained by the second party performing encryption processing on encryption identification information in the first identification information union set based on one or more other second secret keys, the first identification information union set being obtained by combining the first encryption identification information and the second encryption identification information, and the one or more other second secret keys comprising one or more second secret keys in the plurality of the second secret keys other than the part of the second secret key; and performing encryption processing on encryption identification information in the third identification information union set based on one or more other first secret keys, to obtain the target identification information union set, the one or more other first secret keys comprising one or more first secret keys in the plurality of the first secret keys other than the part of the first secret key.

2. The method according to claim 1, wherein the first encryption identification information is obtained by:
performing encryption processing on original identification information of the first party based on the part of the first secret keys, to obtain third encryption identification information; and
transmitting the third encryption identification information to the second party, so that the second party performs encryption processing on the third encryption identification information based on the part of the second secret keys, to obtain the first encryption identification information.

3. The method according to claim 1, wherein the second encryption identification information is obtained by:
receiving fourth encryption identification information transmitted by the second party, the fourth encryption identification information being obtained by the second party performing encryption processing on original identification information of the second party based on the part of the second secret keys; and
performing encryption processing on the fourth encryption identification information based on the part of the first secret keys, to obtain the second encryption identification information.

4. The method according to claim 1, wherein said determining, based on the target identification information union set, the target sample data set for training the joint training model comprises:
acquiring target encryption identification information of the first party;
traversing each target encryption identification information in the target identification information union set;
determining whether the target encryption identification information currently traversed in the target identification information union set is target encryption identification information of the first party;
adding original sample data of the first party corresponding to the currently traversed target encryption identification information into a sample data set, when the currently traversed target encryption identification information in the target identification information union set is target encryption identification information of the first party; or
adding generated sample data of the first party corresponding to the currently traversed target encryption identification information into the sample data set, when the currently traversed target encryption identification information in the target identification information union set is not target encryption identification information of the first party; and
obtaining the target sample data set, in response to completion of traversing the target encryption identification information in the target identification information union set.

5. The method according to claim 4, wherein the secret key of the first party comprises a plurality of first secret keys, and said acquiring the target encryption identification information of the first party comprises:
performing encryption processing on original identification information of the first party based on at least one of the first secret keys, to obtain fifth encryption identification information;
transmitting the fifth encryption identification information to the second party, so that the second party performs encryption processing on the fifth encryption identification information based on the secret key of the second party, to obtain sixth encryption identification information;
receiving the sixth encryption identification information transmitted by the second party; and
determining the target encryption identification information of the first party based on the sixth encryption identification information.

6. The method according to claim 5, wherein said determining the target encryption identification information of the first party based on the sixth encryption identification information comprises:
determining the sixth encryption identification information as the target encryption identification information of the first party, when the at least one first secret key comprises all the first secret keys in the plurality of the first secret keys; and
performing encryption processing on the sixth encryption identification information based on one or more first secret keys in the plurality of the first secret keys other than the at least one first secret key, to obtain the target encryption identification information of the first party, when the at least one first secret key does not comprise all the first secret keys in the plurality of the first secret keys.

7. The method according to claim 1, wherein the first party is an active party of the joint training model, and the second party is a passive party of the joint training model; or
the first party is a passive party of the joint training model, and the second party is an active party of the joint training model.

8. A non-transitory computer readable medium, having a computer program stored thereon, wherein when the computer program is executed by a processor, causes the processor to perform a method for data protection, comprising:
acquiring a target identification information union set, the target identification information union set comprising target encryption identification information of a first party of a joint training model and target encryption identification information of a second party of the joint training model, the target encryption identification information in the target identification information union set being obtained by encrypting based on a secret key of the first party and a secret key of the second party; and
determining, based on the target identification information union set, a target sample data set for training the joint training model,
wherein the secret key of the first party comprises a plurality of first secret keys, the secret key of the second party comprises a plurality of second secret keys, and the target identification information union set is obtained based on first encryption identification information of the first party and second encryption identification information of the second party, the first encryption identification information and the second encryption identification information being obtained by encrypting based on a part of the plurality of the first secret keys and a part of the plurality of the second secret keys; and
wherein said acquiring the target identification information union set comprises:
acquiring the first encryption identification information and the second encryption identification information; combining the first encryption identification information and the second encryption identification information, to obtain a first identification information union set, and performing encryption processing on encryption identification information in the first identification information union set based on one or more other first secret keys, to obtain a second identification information union set, wherein, the one or more other first secret keys comprise one or more first secret keys in the plurality of the first secret keys other than the part of the first secret key; transmitting the second identification information union set to the second party, so that the second party performs encryption processing on encryption identification information in the second identification information union set based on one or more other second secret keys, to obtain the target identification information union set, wherein the one or more other second secret keys comprise one or more second secret keys in the plurality of the second secret keys other than the part of the second secret key; and receiving the target identification information union set transmitted by the second party; or
receiving a third identification information union set transmitted by the second party, the third identification information union set being obtained by the second party performing encryption processing on encryption identification information in the first identification information union set based on one or more other second secret keys, the first identification information union set being obtained by combining the first encryption identification information and the second encryption identification information, and the one or more other second secret keys comprising one or more second secret keys in the plurality of the second secret keys other than the part of the second secret key; and performing encryption processing on encryption identification information in the third identification information union set based on one or more other first secret keys, to obtain the target identification information union set, the one or more other first secret keys comprising one or more first secret keys in the plurality of the first secret keys other than the part of the first secret key.

9. An electronic device, comprising: a memory having a computer program stored thereon; and a processor configured to execute the computer program in the memory, to:
acquire a target identification information union set, the target identification information union set comprising target encryption identification information of a first party of a joint training model and target encryption identification information of a second party of the joint training model, the target encryption identification information in the target identification information union set being obtained by encrypting based on a secret key of the first party and a secret key of the second party; and
determine, based on the target identification information union set, a target sample data set for training the joint training model,
wherein the secret key of the first party comprises a plurality of first secret keys, the secret key of the second party comprises a plurality of second secret keys, and the target identification information union set is obtained based on first encryption identification information of the first party and second encryption identification information of the second party, the first encryption identification information and the second encryption identification information being obtained by encrypting based on a part of the plurality of the first secret keys and a part of the plurality of the second secret keys; and
wherein said acquiring the target identification information union set comprises:
acquiring the first encryption identification information and the second encryption identification information; combining the first encryption identification information and the second encryption identification information, to obtain a first identification information union set, and performing encryption processing on encryption identification information in the first identification information union set based on one or more other first secret keys, to obtain a second identification information union set, wherein, the one or more other first secret keys comprise one or more first secret keys in the plurality of the first secret keys other than the part of the first secret key; transmitting the second identification information union set to the second party, so that the second party performs encryption processing on encryption identification information in the second identification information union set based on one or more other second secret keys, to obtain the target identification information union set, wherein the one or more other second secret keys comprise one or more second secret keys in the plurality of the second secret keys other than the part of the second secret key; and receiving the target identification information union set transmitted by the second party; or receiving a third identification information union set transmitted by the second party, the third identification information union set being obtained by the second party performing encryption processing on encryption identification information in the first identification information union set based on one or more other second secret keys, the first identification information union set being obtained by combining the first encryption identification information and the second encryption identification information, and the one or more other second secret keys comprising one or more second secret keys in the plurality of the second secret keys other than the part of the second secret key; and performing encryption processing on encryption identification information in the third identification information union set based on one or more other first secret keys, to obtain the target identification information union set, the one or more other first secret keys comprising one or more first secret keys in the plurality of the first secret keys other than the part of the first secret key.

10. The electronic device according to claim 9, wherein the first encryption identification information is obtained by:
performing encryption processing on original identification information of the first party based on the part of the first secret keys, to obtain third encryption identification information; and
transmitting the third encryption identification information to the second party, so that the second party performs encryption processing on the third encryption identification information based on the part of the second secret keys, to obtain the first encryption identification information.

11. The electronic device according to claim 9, wherein the second encryption identification information is obtained by:
receiving fourth encryption identification information transmitted by the second party, the fourth encryption identification information being obtained by the second party performing encryption processing on original identification information of the second party based on the part of the second secret keys; and
performing encryption processing on the fourth encryption identification information based on the part of the first secret keys, to obtain the second encryption identification information.

12. The electronic device according to claim 9, wherein said determining, based on the target identification information union set, the target sample data set for training the joint training model comprises:
acquiring target encryption identification information of the first party;
traversing each target encryption identification information in the target identification information union set;
determining whether the target encryption identification information currently traversed in the target identification information union set is target encryption identification information of the first party;
adding original sample data of the first party corresponding to the currently traversed target encryption identification information into a sample data set, when the currently traversed target encryption identification information in the target identification information union set is target encryption identification information of the first party; or
adding generated sample data of the first party corresponding to the currently traversed target encryption identification information into the sample data set, when the currently traversed target encryption identification information in the target identification information union set is not target encryption identification information of the first party; and
obtaining the target sample data set, in response to completion of traversing the target encryption identification information in the target identification information union set.

13. The electronic device according to claim 12, wherein the secret key of the first party comprises a plurality of first secret keys, and said acquiring the target encryption identification information of the first party comprises:
performing encryption processing on original identification information of the first party based on at least one of the first secret keys, to obtain fifth encryption identification information;
transmitting the fifth encryption identification information to the second party, so that the second party performs encryption processing on the fifth encryption identification information based on the secret key of the second party, to obtain sixth encryption identification information;
receiving the sixth encryption identification information transmitted by the second party; and
determining the target encryption identification information of the first party based on the sixth encryption identification information.

14. The electronic device according to claim 13, wherein said determining the target encryption identification information of the first party based on the sixth encryption identification information comprises:
determining the sixth encryption identification information as the target encryption identification information of the first party, when the at least one first secret key comprises all the first secret keys in the plurality of the first secret keys; and
performing encryption processing on the sixth encryption identification information based on one or more first secret keys in the plurality of the first secret keys other than the at least one first secret key, to obtain the target encryption identification information of the first party, when the at least one first secret key does not comprise all the first secret keys in the plurality of the first secret keys.

* * * * *